United States Patent [19]

Crossland et al.

[11] 3,917,607

[45] Nov. 4, 1975

[54] BLOCK COPOLYMER ADHESIVE COMPOSITIONS

[75] Inventors: Ronald K. Crossland, Manhattan Beach; James T. Harlan, Jr., Torrance, both of Calif.

[73] Assignee: Shell Oil Company, Houston, Tex.

[22] Filed: Nov. 23, 1973

[21] Appl. No.: 418,716

Related U.S. Application Data

[63] Continuation of Ser. No. 182,870, Sept. 22, 1971, abandoned.

[52] U.S. Cl.... 260/28.5 B; 260/27 BB; 260/33.6 A; 260/876 B; 260/880 B
[51] Int. Cl.².......................................... C08L 91/08
[58] Field of Search........ 260/876 B, 880 B, 28.5 B, 260/33.6 A, 27 BB

[56] References Cited

UNITED STATES PATENTS

| | | | |
|---|---|---|---|
| 3,231,635 | 1/1966 | Holden et al. | 260/876 B |
| 3,239,478 | 3/1966 | Harlan, Jr. | 260/880 B |
| 3,325,430 | 6/1967 | Grasely | 260/876 B |
| 3,632,540 | 1/1972 | Unmuth et al. | 260/28.5 B |
| 3,686,107 | 8/1972 | Russel | 260/876 B |

*Primary Examiner*—Melvyn I. Marquis

[57] ABSTRACT

Stable adhesive compositions are provided comprising blends of certain partially hydrogenated block copolymers, a tackifying resin compatible with one of the polymer blocks, and a high melting point resin compatible with another type of the polymer blocks. Waxes, extending oils and solvents may be present as well.

6 Claims, No Drawings

BLOCK COPOLYMER ADHESIVE COMPOSITIONS

This is a continuation of application Ser. No. 182,870, filed Sept. 22, 1971 and now abandoned.

This invention relates to improved adhesive compositions. More particularly, it relates to adhesive compositions having improved oxidation resistance, tack and high temperature properties.

Among the many patents dealing with adhesives, a very limited number are concerned with elastomeric block copolymer adhesives. Specifically, U.S. Pat. No. 3,239,478 is the basic patent in this area. It is directed to block copolymers which are either non-hydrogenated or hydrogenated, combined with an oil and a tackifying resin. While adhesive compositions of this general description are suitable for many purposes, they may lack a combination of critical properties which limit their broader commercial utilization. For example, if only a tackifying resin is present, it has been found that the resulting adhesive compositions are deficient in adhesive characteristics at relatively high temperatures. For many purposes, it is desirable that an adhesive functions satisfactorily not only at room temperature but at substantially higher temperatures, on the order of 80°–120°C.

It is an object of the present invention to provide improved adhesive compositions. It is a particular object of the invention to provide adhesive compositions with good adhesive characteristics at relatively high temperatures. Further objects of the invention are to provide improved sealants, calking compounds, binders, bonding agents, mastics and other compositions requiring an optimum combination of adhesive characteristics. Other objects will become apparent during the following detailed description of the invention.

Now, in accordance with the present invention, improved adhesive compositions are provided having an unpredictable combination of properties comprising the following components and hereafter referred to as the basic formulation:

|   | Parts by weight |
|---|---|
| a) A selectively hydrogenated block copolymer as defined hereinafter | 100 |
| b) Tackifying resin | 25–300 |
| c) High softening point block A — compatible resin | 10–200 |
| d) Extending oil | 0–200 |

The block copolymers contemplated for use in these compositions have two essential types of blocks, A and B. At least two blocks A are present and at least one block B is present in the block copolymer. The copolymer may be either linear or branched in structure and mixtures of such configurations may be employed. Blocks A comprise predominantly polymer blocks of at least one monoalkenyl arene while blocks B comprise predominantly hydrogenated polymer blocks of at least one conjugated diene. Moreover, blocks A are characterized in that no more than 25% of the original aromatic double bonds are reduced by hydrogenation while blocks B are characterized by having at least 75% of their aliphatic double bonds reduced by hydrogenation. It is possible, in fact, to prepare block copolymers in which the blocks B are poly(alpha mono olefin) blocks which are regarded here as being substantially equivalent to substantially completely hydrogenated polymer blocks of conjugated dienes. The remaining specification and the claims are meant to include within their scope these alpha mono olefin equivalents of fully hydrogenated polymer blocks of conjugated dienes.

Blocks A are prepared by block polymerization of such monomers as styrene, alpha methyl styrene, tert-butyl styrene and vinyl toluene. Blocks B are prepared by block polymerizing conjugated dienes such as butadiene or isoprene and thereafter hydrogenating the polymer block.

For simplicity, reference will be made to several basic types of block copolymers especially contemplated herein. However, it will be understood that block copolymers may be prepared by coupling polymeric lithium carbanions, some of which may leave coupling agent residues. Linear as well as branched multi-block structures also are contemplated. The methods are known in the art for synthesizing both linear and branched block copolymers, using sequential polymerization alone or sequential polymerization followed by coupling procedures.

Typical block copolymers especially contemplated are the following:

1. Polystyrene-hydrogenated polybutadiene-polystyrene.
2. Polystyrene-hydrogenated polyisoprene-polystyrene.
3. Poly(alpha methyl styrene)-hydrogenated polybutadiene-poly(alpha methyl styrene).
4. Poly(alpha methyl styrene)-hydrogenated polyisoprene-poly(alpha methyl styrene).

Each block A has an average molecular weight between about 2,000 and 125,000, preferably between about 5,000 and 50,000. Each block B has an average molecular weight between about 10,000 and 250,000, preferably between about 30,000 and 150,000. There are number average molecular weights determined by such methods as tritium counting or osmotic pressure measurements.

The classes of tackifying resins especially contemplated in the present invention are those which are compatible with blocks B and substantially incompatible with blocks A. By "compatibility" is meant compatibility at the level used in the formulation. In the case of polystyrene-hydrogenated polybutadiene-polystyrene block copolymers (for screening purposes), the following method is used: To check for block A compatibility, films of 100 parts of polystyrene having a molecular weight between 8,000 and 15,000 and 25, 50, 100 and 200 parts of resin are cast from solution in toluene. To check for block B compatibility, films of 100 parts hydrogenated polybutadiene produced from a polybutadiene having a 1,2-content greater than 20%, and having a molecular weight between 5,000 and 20,000; and 25, 50, 100 and 200 parts of resin are cast from solution in toluene. Clear films indicate that the resin is compatible at the corresponding resin level. Often resins are compatible at 25 and 50 parts but not at 100 or 200 parts.

For tackifying resins as used herein, incompatibility between 25 parts resin and 100 parts of polystyrene is desirable and incompatibility between 50 parts resin and 100 parts of polystyrene is necessary. Similarly, compatibility between 200 parts of resin and 100 parts of the hydrogenated polybutadiene is desirable and compatibility between 100 parts resin and 100 parts hydrogenated polybutadiene is necessary. Suitable classes of tackifying resins are the following:

TACKIFYING RESINS a. Copolymer of 40–80 wt % 1,3-pentadiene and 60–20 wt % 2-methyl-2-butene.
b. Polyhydric esters of rosin or hydrogenated rosin.
c. Alpha-pinene resins.
d. Beta-pinene resins.
e. Olefinic resins.
f. Synthetic polyterpenes.

The second type of resin utilized in the compositions of this invention may be broadly referred to as "high softening point block A – compatible resins". For such resins as used herein, incompatibility between 50 parts of the resin and 100 parts of the hydrogenated polybutadiene is desirable but not necessary. More importantly, compatibility between 100 parts of the resin and 100 parts of the polystyrene is desirable and compatibility between 50 parts of the resin and 100 parts of the polystyrene is necessary. In addition, the block A compatible resins must have a softening point above about 100°C, as determined by ASTM Method E 28, using a ring and ball apparatus.

The following are resins which meet the above block A compatibility and softening point requirements:

Block A — Compatible Resins

| | |
|---|---|
| a) Coumarone — indene resins | e.g., 104–155°C softening point |
| b) Vinyl toluene-alpha methyl styrene copolymers | e.g., 120°C softening point |
| c) Alpha methyl styrene homopolymers | e.g., 147°C softening point |
| d) Polyindene resins | e.g., 130°C softening point |
| e) Polystyrene resins | e.g., 101°C softening point |

Analogous procedures for compatibility determinations on other block copolymer types are evident from the above description.

Many other types of resins are available and have been tested for possible use in the compositions of this invention. However, it has been found that if block A - compatible resins have softening points substantially below about 100°C the resulting compositions have poorer hot temperature characteristics. Furthermore, it has been determined that if a resin which is substantially compatible with both types of blocks or which is incompatible with both types of blocks in the formulation is employed together with the subject block copolymer, the resulting compositions are often either inoperative, heterogeneous or have properties which are deficient in one respect or another, seriously limiting the scope of their commercial utility.

The term "extending oils" as used in the description of this invention broadly encompasses not only the usual extending oils for rubbers prepared from petroleum fractions but also contemplates the use of olefin oligomers and low molecular weight polymers as well as vegetable and animal oil and their derivatives.

The petroleum derived extending oils which may be employed are relatively high boiling materials containing only a minor proportion of aromatic hydrocarbons (preferably less than 30% and, more particularly, less than 15% by weight of the oil). Preferably the petroleum oils contain between about 30 and 45% naphthenic carbon atoms, between 35 and 65% by weight of paraffinic carbon atoms, the balance being aromatic carbon atoms and have number average molecular weights between about 300 and 1,400. The oligomers may be polypropylenes, polybutenes, hydrogenated polyisoprene, hydrogenated polybutadiene, or the like having average molecular weights between about 350 and about 10,000. Vegetable and animal oils include glyceryl esters of the usual fatty acids and polymerization products, factice, etc.

The basic formulation not containing extending oils is useful as a pressure-sensitive adhesive or as a contact adhesive. Aggressive tack may be increased by addition of up to 200 parts of extending oils (per 100 parts by weight of block copolymer) to the basic formulation. Preferred pressure sensitive formulations fall within the following ranges:

| | Parts by Weight |
|---|---|
| Block copolymer | 100 |
| Tackifying resin | 50–200 |
| High softening point Block A — compatible resin | 10–150 |
| Extending oils | 0–200 |

A typical pressure sensitive formulation is given herewith:

| | |
|---|---|
| Block copolymer | 100 |
| Tackifying resin | 100 |
| High softening point resin | 10 |
| Polypropylene oligomer | 25 |

Preferred contact adhesive formulations fall within the following ranges:

| | |
|---|---|
| Block copolymer | 100 |
| Tackifying resin | 50–150 |
| High softening point Block A — compatible resin | 50–200 |
| Extending oils | 0–50 |

A typical contact adhesive formulation is given herewith:

| | |
|---|---|
| Block copolymer | 100 |
| Tackifying resin | 75 |
| High softening point Block A — compatible resin | 100 |
| Extending oils | 25 |

The resulting formulations may be applied by the usual methods known in the art, such as by solution application or melt application. A superior pressure sensitive formulation for hot melt application is the following:

| | Parts by Weight |
|---|---|
| Block copolymer | 100 |
| Tackifying resin | 150 |
| High softening point Block A— compatible resin | 50 |
| Petroleum extending oil | 100 |

Hot melt adhesives (other than pressure sensitive hot melts) may be prepared by modifying the basic adhesive system with waxes, especially paraffin wax and/or microcrystalline wax. Preferred hot melt adhesive formulations according to this invention are as follows:

|                                         | Parts by Weight |
|-----------------------------------------|-----------------|
| Block copolymer                         | 100             |
| Tackifying resin                        | 25–300          |
| High softening point Block A— compatible resin | 10–200   |
| Wax                                     | 25–900          |
| Extending oils                          | 0–200           |

A formulation exhibiting superior hot melt adhesive properties is presented:

|                                         | Parts by Weight |
|-----------------------------------------|-----------------|
| Block copolymer                         | 100             |
| Tackifying resin                        | 100             |
| High softening point Block A— compatible resin | 50       |
| Paraffin wax                            | 75              |
| Microcrystalline wax                    | 75              |
| Extending oils                          | 50              |

The compositions of this invention may be modified with supplementary materials including pigments, fillers, and the like as well as stabilizers and oxidation inhibitors.

The compositions of the present invention may be employed under a wide variety of uses. They may be applied to paper, paper boards, wood, metal, polyolefin films, fabrics, glass, etc. They are specifically useful in pressure sensitive tapes, masking tapes, adhesive tapes, electrical insulation tapes, laminates, hot melts, mastics, cements, calking compounds, contact adhesives, latices and other situations. It has been demonstrated that the use of a single resin rather than the combination of resins as described above provide unsatisfactory compositions in one respect or another. The following examples illustrate the benefits of the present invention.

EXAMPLE I

Pressure Sensitive Adhesives

The desirability for the presence of the high softening point block A - compatible resin in the formulations is demonstrated by the following comparative data:

The block copolymer employed had the structure polystyrene-hydrogenated polybutadiene-polystyrene with block molecular weights of 10,000–50,000–10,000. The unhydrogenated precursor contained 40% 1,2-structure in the polybutadiene block. A composition having the following components was blended and tested for its shear adhesion time at 100°C.

|                  | Parts by Weight |
|------------------|-----------------|
| Block copolymer  | 100             |
| Tackifying resin | 100             |
| Extending oils   | 25              |

The same formulation was modified by the additional presence of 100 parts by weight of a coumarone-indene resin having a softening point of 155°C. These two compositions were tested for shear adhesion utilizing method No. 7 of the Pressure Sensitive Tape Council. The conditions employed were a mylar-stainless steel lap bond with an adhesive layer thickness of 1–2 mils; overlap area 0.5 sq inch; shear load 500g. The composition having the single resin had a shear adhesion time at 100°C of 16 hours, while the composition having both types of resins had a shear adhesion time at 100°C of 380 hours.

The tackifying resin employed was a copolymer of about equal quantities of 1,3 pentadiene and 2-methyl-2-butene.

EXAMPLE II

Hot Melt Adhesive

The following formulation was designed to have an extremely steep viscosity temperature slope line so as to promote quick setup, hot tack and high bond use temperature. The same block copolymer as utilized in Example I was employed in the following formulation:

|    |                                      | Parts by Weight |
|----|--------------------------------------|-----------------|
| a) | Block copolymer                      | 100             |
| b) | Tackifying resin                     | 100             |
| c) | Vinyl toluene/alpha methyl styrene copolymers | 50     |
| d) | Polypropylene oligomer               | 50              |
| e) | Paraffin wax                         | 75              |
| f) | Microcrystalline wax                 | 75              |

This composition had a steep viscosity-temperature slope as illustrated by the following data:

| Temp °F | Brookfield Viscosity (cp) |
|---------|---------------------------|
| 325     | 136,000                   |
| 355     | 20,000                    |
| 410     | 3,000                     |

EXAMPLE III

The following basic formulation was modified with three types of resins and then tested for shear adhesion time at 100°C by the method described in Example I.

|                        | Parts by Weight |
|------------------------|-----------------|
| Block copolymer        | 100             |
| Tackifying resin       | 100             |
| Polypropylene oligomers| 25              |

The table below shows the addition of several different proportions of each of three types of resins to the above basic formula and also shows the shear adhesion times of these modified formulations:

| Second Resin | Parts by Weight | Shear Adhesion Time at 100°C (min) |
|--------------|-----------------|------------------------------------|
| Coumarone-indene | 10 | 1,700 |
| Coumarone-indene | 25 | 23,100 |
| Methyl ester of hydrogenated rosin | 10 | 43 |
| Methyl ester of hydrogenated rosin | 25 | 9 |

In the above formulations the block copolymer was the same as that employed in Example I and II. Moreover, the tackifying resin was the same as that employed in Examples I and II. In the above table, it will be noted that coumarone-indene resin (meeting the terms of the present invention and being a high melting point resin compatible only with the polystyrene blocks) gave a far longer shear adhesion time to failure than did the methyl ester of hydrogenated rosin. The latter resin is not within the scope of the present invention since it has been found to be substantially compatible with both types of blocks of the block copolymer.

We claim as our invention:

1. An adhesive composition comprising:
   a. 100 parts by weight of a block copolymer having at least two polymer blocks A and at least one polymer block B, each block A being a non-elastomeric polymer block of a monoalkenyl arene having an average molecular weight between about 2,000 and about 125,000 and each block B being an elastomeric hydrogenated polymer block of a conjugated diene, having an average molecular weight between about 10,000 and about 250,000;
   b. 25–300 parts by weight of a tackifying resin being compatible predominantly with block B and substantially incompatible with block A of the block copolymer and selected from the group consisting of copolymers of 40–80 wt. % 1,3-pentadiene and 60–20 wt. % 2-methyl-2-butene, polyhydric esters of resin, polyhydric esters of hydrogenated resin, alphapinene resins, beta-pinene resins olefinic resins and synthetic polyterpenes;
   c. 10–200 parts by weight of a predominantly aromatic second resin having a softening point above about 100°C, said second resin being compatible predominantly with block A and substantially incompatible with block B of the block copolymer and selected from the group consisting of coumarone-indene resins, vinyl toluene-alpha methyl styrene copolymers, alpha methyl styrene homopolymers, polyindene resins and polystyrene resins; and
   d. 0–200 parts by weight of extending oil said oil being predominantly compatible with block B of the block copolymer.

2. An adhesive composition according to claim 1 where:
   a. the block copolymer is polystyrene/hydrogenated polybutadiene/polystyrene;
   b. the tackifying resin is a copolymer of 40–80 wt. % 1,3-pentadiene and 60–20 wt. % a 2-methyl-2-butene;
   c. the second resin is a coumarone-indene resin having a softening point of 155°C;
   d. the extending oil is a polypropylene oligomer.

3. A pressure sensitive adhesive composition according to claim 1 wherein; component (b) is present in the range of 50–200 parts by weight, and component (c) is present in the range of 10–150 parts by weight.

4. A hot melt adhesive composition according to claim 1 containing 25–900 parts by weight of petroleum wax.

5. A hot melt adhesive composition according to claim 4 wherein the tackifying resin has a softening point between 80°C and 110°C and is a copolymer comprising 40–80 wt % units derived from 1,3 pentadiene and 60–20 wt % units derived from 2-methyl-2-butene.

6. A composition according to claim 4 wherein wax comprises 1–3 parts by weight of a paraffin wax and 1–3 parts by weight of a microcrystalline wax.

* * * * *